June 14, 1938.    F. NELL    2,120,621
CHASER ASSEMBLY
Original Filed Feb. 5, 1935
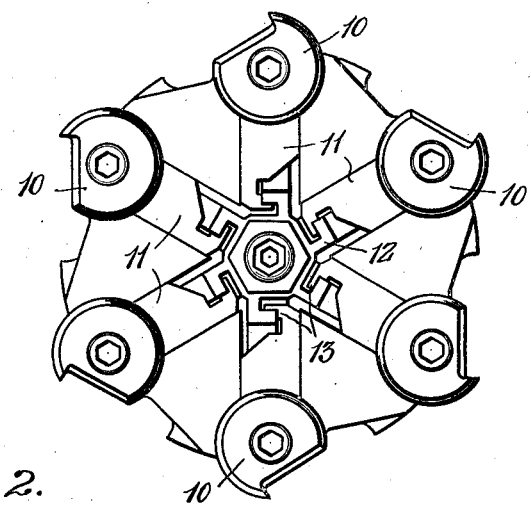
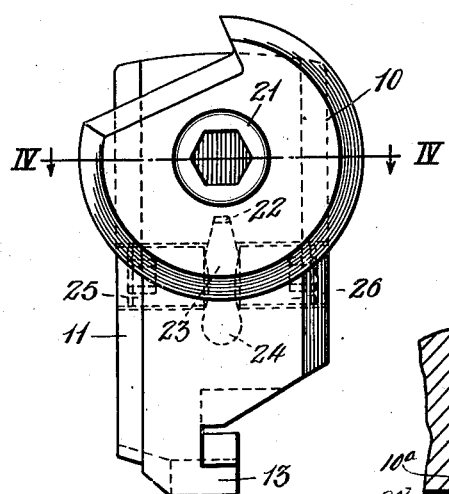
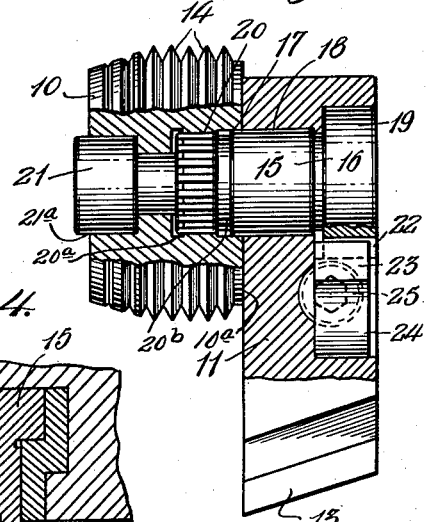
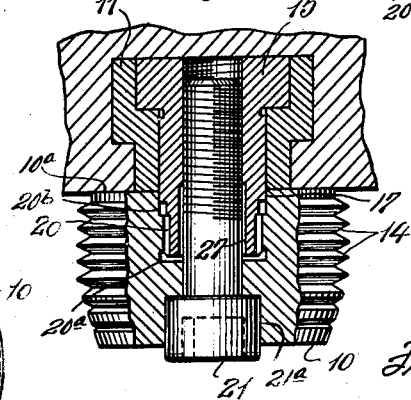
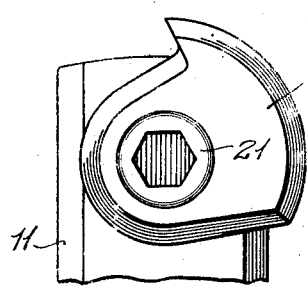
Inventor
Frederic Nell
By
Attorney Patented June 14, 1938

2,120,621

UNITED STATES PATENT OFFICE 2,120,621

CHASER ASSEMBLY

Frederic Nell, Waynesboro, Pa., assignor to Landis Machine Company, Waynesboro, Pa., a corporation of Pennsylvania Original application February 5, 1935, Serial No. 5,129. Divided and this application May 28, 1935, Serial No. 23,901

12 Claims. (Cl. 10—103)

My invention relates to taps provided with thread cutting chasers and more particularly to circular chasers and means for holding the same in operative relation to the body portion of the tap.

The present application is a division of my prior application, Ser. No. 5,129, filed February 5, 1935.

It is an object of my invention to provide a screw thread cutting device having circular chasers mounted on slides or holders for ready adjustment or removal.

Another object of my invention is to provide improved means for adjusting the cutting edge of a circular chaser about its own axis.

A still further object of my invention is to provide a tap or threading device embodying circular chasers supported in a manner to obviate breakage of the chasers or the holders therefor upon the subjection of the chasers during ordinary threading operations to abnormal or excessive stresses or strains.

Other objects and advantages will be apparent from the following description taken in connection with the accompanying drawing which is made a part hereof and wherein Fig. 1 is a front elevation of a tapping head to which the invention may be applied;

Fig. 2, an enlarged front elevation of one of the circular chasers and its chaser holder;

Fig. 3, a detail part side elevation part sectional view of the chaser and holder shown in Fig. 2;

Fig. 4, a section on the line IV—IV, Fig. 2, and

Fig. 5, a front elevation of a chaser and holder similar to Fig. 2 after the chaser has been repeatedly sharpened.

Referring to Fig. 1, a tapping head is shown comprising circular chasers 10 mounted on slides or holders 11, the latter being radially movable in the body of the tap to permit collapsing of the chasers. The improved chaser and holder may be embodied in various forms of taps or threading devices, such for example as that disclosed in the patent to Newman, #1,811,802 or that shown in my prior application, Ser. No. 710,171, filed January 29, 1934. The positions of the chaser holders or slides 11 are controlled by a suitable cam member such as that indicated at 12 which is provided with angular slots to receive the projecting cam portions 13 of the chaser slides.

As shown more clearly in Figs. 2, 3 and 4, the chasers 10 are provided with peripheral cutting edges 14 corresponding to the threads to be cut. Each chaser has a flat rear face 10a and is mounted on the outer side of the chaser holder or slide 11 with said face 10a in surface contact therewith, and is located diametrically by a bushing 15 which extends through the slide 11 with a plain or piloting section 16 fitting snugly against the preferably cylindrical surfaces 17 and 18 of the chaser and slide respectively. The bushing 15 is interposed between the slide 11 and the chaser 10 and is provided with an enlarged end portion 19 and with uniform spaced sockets to receive the uniformly spaced splines 20 of the chaser. In this manner the chaser 10 may be mounted upon the bushing and slide in any one of a plurality of closely spaced angular positions in order to present the cutting edges of the chaser in the proper relationship to the work. The chaser is securely clamped to the slide with a screw 21 having a cylindrical head 21a fitting a complemental recess in the chaser and also having a shank threaded into the bore of the bushing 15 through only a part of the length of said bore, as shown in Fig. 4. The dimensions of the parts are such that when the screw is tightened the outer end of the bushing 15 remains out of contact with the chaser. The sharpening of the chaser necessarily changes the position of the cutting edges but, as shown in Fig. 5, the chaser may be used after repeated sharpening by turning the same upon the holder 11 to position the cutting edges properly in relation to the axis of the slide. The splines 20 not only are shorter than the recess in which they are formed in the chaser but also form an annulus of smaller diameter than said recess so that the spline roots or grooves are disposed farther inwardly than the wall of the recess, thus forming a pair of short annular clearances 20a and 20b when the parts are assembled. The unthreaded or outer end of the bushing bore is made of sufficient size to form a clearance 27 between the screw shank and that part of the bushing which carries the splines.

In order to effect a precise adjustment of the cutting edges of the chaser with respect to the slide 11, the enlarged end 19 of the bushing 15 is provided with a notch 22 to receive a gear tooth or finger 23 which is mounted in a socket 24 in the slide 11. The finger 23 is clamped between two opposing screws 25 and 26, threaded into the slide 11 and adapted to engage the opposite sides of said finger and lock the same in adjusted position. The ends of said screws 25 and 26 may be provided with sockets to receive an adjusting wrench as shown. It will be apparent that by loosening one of the screws 25 or 26 and tightening the opposite screw, the finger 23 may be rocked to turn the chaser 10 and bushing 15 upon the slide 11 and thereby adjust the cutting edges of the chaser.

Preferably the splines 20 in the chaser are so spaced that the rotative adjustment of the chaser by means of the finger 23 may be greater than that secured by advancing the chaser on the bushing 15 by one spline. In this manner an accurate adustment of the cutting edge of the chaser 10 is always possible. The bushing 15 is free to turn in the slide 11 when the clamping screw 21 is loosened, except for its engagement with the finger 23, and is tightly held when the clamping screw 21 is tightened.

Heretofore circular chasers have been used in which the chaser is held against rotation by serrations upon the chaser and holder. In such constructions when the chasers were subjected to abnormal stresses beyond the usual threading cutting requirements, the serrations in the chaser and holder were sheared off and either the chaser or the holder or both were badly damaged so that they could not be repaired and it was necessary to replace the chaser and holder. In the construction shown, the finger 23 has less shearing strength than the splines on the chaser so that if the tap is subjected to abnormal stresses, the finger 23 will be sheared off without damage to the chaser or holder. This construction has the advantage that the tap may be readily repaired or the finger 23 replaced thereby saving the expense of replacing the chaser or slide.

It will be apparent that the circular chaser and the supporting means therefor, as described above, may be utilized in connection with various forms of threading devices and that various modifications in the details of the construction and arrangement of the elements thereof may be made without departing from the spirit of the invention.

I claim:

1. A chaser assembly comprising a circular chaser, a movable supporting member therefor, a bushing carried by said member, means for locking said chaser and bushing together, a pivoted finger in the supporting member engaging said bushing for turning the bushing to adjust the cutting edges of the chaser, and means cooperating with the finger and said supporting member for adjusting and holding the bushing and chaser by said finger selectively in adjusted positions.

2. A chaser assembly comprising a circular chaser, a radially movable supporting member therefor, a bushing carried by said member concentric with the chaser, means for securing said chaser against turning movement relative to said bushing including splines on one of said elements arranged to provide desired angularity of the adjustment of said chaser on said bushing, means for rotatively adjusting said bushing with respect to said supporting member including a finger on one engaging in a slot in the other, and means cooperating with the finger and the member upon which it is mounted for adjusting and locking them against relative movement.

3. A chaser assembly comprising a circular chaser, a supporting member therefor, a bushing carried by said member concentric with the chaser, said chaser being provided with uniformly spaced splines engaging the bushing, adjusting means on the supporting member for turning the bushing to adjust the cutting edges of the chaser in relation to said member, and means cooperating with the adjusting means and supporting member for securing the bushing by said adjusting means selectively in adjusted positions.

4. In combination, a circular chaser, a supporting member therefor having a cylindrical bore, a bushing keyed to said chaser and extending into said bore and means movable to adjust the angular position of the bushing and adapted to be ruptured when the chaser is subjected to abnormally high or concentrated stresses during threading operations, and means engageable with said adjusting means for preventing rotative movement of the chaser and bushing from its adjusted position with respect to said supporting member.

5. In combination, a circular chaser, a supporting member therefor, a bushing carried by said member concentric with the chaser and keyed thereto a pivoted tooth or finger on said member and engaging the bushing and adapted to be sheared off when the chaser is subjected to stresses greater than those imposed by ordinary thread cutting operations, and means cooperating with said tooth or finger and support for adjusting and holding the bushing by said tooth or finger selectively in its adjusted positions.

6. A chaser block, a rotatably mounted chaser support carried by said block, a chaser on said support, means for rotatably adjusting said chaser relative to said support, the support having a notch therein, a member pivotally mounted on the block and engaging the notch in the support, and means cooperating with the member and block for pivotally adjusting and holding the support by said member selectively in adjusted positions.

7. A chaser block, a rotatably mounted chaser support carried by said block, a chaser on said support, means for rotatably adjusting said chaser relative to said support, the block having a recess therein and the support being provided with a notch, a member movably mounted in said recess and engaging said notch, and means cooperating with the member and block for adjusting and holding the support by said member selectively in adjusted positions.

8. A chaser assembly comprising an apertured support, an internally threaded bushing extending through said aperture and having an enlargement nested in the rear side of said support, the front end of said bushing having an external serrated annulus, a cutter in surface abutment with said support and having an internal serrated annulus complemental to said external annulus, and a bolt having a head engaging the front side of said cutter and a threaded shank screwed into that portion of said bushing which is received in said support rearwardly of the cutter, and the forward portion of said bushing having an internal diameter different from that of the forward part of said shank thereby to form an annular clearance space between them in the region of the serrated annuli.

9. A chaser assembly comprising a support, a cutter in surface abutment with said support and having an internal serrated annulus, a member designed to be secured to said support and having an external serrated annulus complemental to said internal annulus, a cylindrical piloting and supporting formation on said member rearwardly of said serrated annuli and forwardly of said support, and a cylindrical pilot surface on said cutter snugly surrounding said cylindrical formation.

10. A chaser assembly comprising a support, a cutter having an internal serrated annulus, a member designed to be secured to said support and having an external serrated annulus complemental to said internal annulus, a cylindrical piloting and supporting formation on said member rearwardly of said serrated annuli, and a cylindrical pilot surface on said cutter snugly surrounding said cylindrical formation, said cutter having a flat rear surface and said support having a complemental surface in snug engagement therewith, the cylindrical formation on said member extending rearwardly into said support with a snug fit, and means for securing said member to said support comprising an element passing through said cutter into the support at right angles with said flat rear surface, said element having a peripherally cylindrical formation snugly fitted into said cutter at a locus forwardly of said serrated annuli.

11. A chaser assembly comprising a support having a substantially flat front surface, a cylindrical member rotatably mounted in said support, a cylindrical piloting surface on said member extending beyond said surface, a circular chaser having a substantially flat rear face and a cylindrical recess opening from said face, said chaser being assembled on said bushing with its rear face engaging said flat surface of said support and its cylindrical recess snugly fitted on said piloting surface, means cooperating with said chaser and said cylindrical member for holding said chaser and said cylindrical member in assembled position, interengaging means on said chaser and said cylindrical member for preventing relative rotation of said chaser with respect to said cylindrical member, and means associated with said support for rotating said cylindrical member to adjust said chaser.

12. A chaser assembly comprising, a circular chaser, a supporting member therefor, a bushing rotatably mounted in said member concentric with said chaser, interengaging means on said chaser and bushing for angularly adjusting said chaser with respect to said bushing and for holding said chaser in adjusted position, adjusting means on said supporting member and engaging said bushing for rotating said bushing, together with said chaser, to adjust the cutting edges of said chaser, and means cooperating with said adjusting means and said supporting member for operating said adjusting means and for securing said bushing, by said adjusting means, selectively in adjusted positions.

FREDERIC NELL.